(12) United States Patent
Sasaki

(10) Patent No.: US 11,999,228 B2
(45) Date of Patent: Jun. 4, 2024

(54) PEDAL-APPLICATION-ERROR ACCIDENT PREVENTING DEVICE

(71) Applicant: SUBARU CORPORATION, Tokyo (JP)

(72) Inventor: Kou Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 287 days.

(21) Appl. No.: 17/687,042

(22) Filed: Mar. 4, 2022

(65) Prior Publication Data

US 2022/0297539 A1 Sep. 22, 2022

(30) Foreign Application Priority Data

Mar. 22, 2021 (JP) ................................. 2021-046809

(51) Int. Cl.
*B60K 26/02* (2006.01)
*B62D 1/181* (2006.01)

(52) U.S. Cl.
CPC .............. *B60K 26/02* (2013.01); *B62D 1/181* (2013.01); *B60K 2026/026* (2013.01)

(58) Field of Classification Search
CPC ........ B62D 1/181; B62D 1/185; B60K 26/02; B60K 26/021; B60K 28/02; B60K 2026/023; B60K 2026/026; B60T 7/042; B60W 10/06; B60W 10/18; B60W 10/184; B60W 30/16; B60W 50/08; B60W 50/16; B60Y 2306/01; B60Y 2306/08; G05G 1/38; G05G 1/405; G05G 5/03

See application file for complete search history.

(56) References Cited

U.S. PATENT DOCUMENTS

2021/0300455 A1* 9/2021 Tokizaki ................ B62D 1/185
2023/0182802 A1* 6/2023 Bayer .................... B62D 1/185
280/775

FOREIGN PATENT DOCUMENTS

JP 2013-233893 A 11/2013
JP 2014-048742 A 3/2014
WO WO 2015/020152 A1 2/2015

* cited by examiner

*Primary Examiner* — Phutthiwat Wongwian
*Assistant Examiner* — Arnold Castro
(74) *Attorney, Agent, or Firm* — MCGINN I.P. LAW GROUP, PLLC

(57) ABSTRACT

A pedal-application-error accident preventing device to be applied to a vehicle includes a steering-wheel-position changing mechanism, a steering-wheel-position adjuster, and an accelerator-pedal-position adjuster. The steering-wheel-position changing mechanism is configured to displace a steering wheel of the vehicle in a vehicle forward-rearward direction. The steering-wheel-position adjuster is configured to displace the steering wheel in accordance with an operation amount of an accelerator pedal of the vehicle such that the steering wheel is positioned further toward a vehicle rearward side as the operation amount of the accelerator pedal operated by a driver who drives the vehicle increases. The accelerator-pedal-position adjuster is configured to displace the accelerator pedal in a direction such that the operation amount of the accelerator pedal returns to zero in a case where the steering wheel is pushed back forward in a state in which the steering wheel is displaced toward the vehicle rearward side.

12 Claims, 7 Drawing Sheets

PEDAL-APPLICATION-ERROR ACCIDENT PREVENTING DEVICE

CROSS-REFERENCE TO RELATED APPLICATIONS

The present application claims priority from Japanese Patent Application No. 2021-046809 filed on Mar. 22, 2021, the entire contents of which are hereby incorporated by reference.

BACKGROUND

The disclosure relates to a pedal-application-error accident preventing device for a vehicle.

A driver of a vehicle adjusts acceleration and deceleration of the vehicle by selectively depressing a brake pedal and an accelerator pedal that are disposed adjacent to each other. In general, the driver performs a braking operation or an accelerating operation by selectively placing one foot (usually, the right foot) on a brake pedal or an accelerator pedal.

If the driver mistakenly depresses the accelerator pedal instead of the brake pedal when the driver wants to decelerate the vehicle, the vehicle may suddenly accelerate and an accident in which the vehicle collides with an object in front of or behind the vehicle may occur. Various devices have been proposed to prevent such an accident due to pedal application error.

For example, Japanese Unexamined Patent Application Publication (JP-A) No. 2013-233893 describes a drive control device that determines that a driver has mistakenly depressed the accelerator pedal instead of the brake pedal and outputs an engine-torque-reducing instruction or a brake-activating instruction to an engine ECU or a brake ECU, for decelerating the vehicle, under the following conditions: the vehicle velocity is less than or equal to a predetermined vehicle velocity; an accelerator-ON counter is a less than or equal to a predetermined period; a seat-back pressing force is greater than or equal to a first predetermined load; a steering-wheel-shaft pressing force is greater than or equal to a second predetermined load; and an accelerator opening degree is greater than or equal to a predetermined opening degree.

Japanese Unexamined Patent Application Publication (JP-A) No. 2014-048742 and International Publication (WO) No. 2015/020152 each describe a misapplication preventing device that is configured in such a way that, instead of operating the accelerator pedal and the brake pedal by foot, a braking operation is performed by foot and an accelerating operation is performed by hand.

SUMMARY

An aspect of the disclosure provides a pedal-application-error accident preventing device to be applied to a vehicle. The pedal-application-error accident preventing device includes a steering-wheel-position changing mechanism, a steering-wheel-position adjuster, and an accelerator-pedal-position adjuster. The steering-wheel-position changing mechanism is configured to displace a steering wheel of the vehicle in a vehicle forward-rearward direction. The steering-wheel-position adjuster is configured to displace the steering wheel in accordance with an operation amount of an accelerator pedal of the vehicle such that the steering wheel is positioned further toward a vehicle rearward side as the operation amount of the accelerator pedal operated by a driver who drives the vehicle increases. The accelerator-pedal-position adjuster is configured to displace the accelerator pedal in a direction such that the operation amount of the accelerator pedal returns to zero in a case where the steering wheel is pushed back forward in a state in which the steering wheel is displaced toward the vehicle rearward side.

An aspect of the disclosure provides a pedal-application-error accident preventing device to be applied to a vehicle. The pedal-application-error accident preventing device includes a steering-wheel-position changing mechanism and circuitry. The steering-wheel-position changing mechanism is configured to displace a steering wheel of the vehicle in a vehicle forward-rearward direction. The circuitry is configured to displace the steering wheel in accordance with an operation amount of an accelerator pedal of the vehicle such that the steering wheel is positioned further toward a vehicle rearward side as the operation amount of the accelerator pedal operated by a driver who drives the vehicle increases, and to displace the accelerator pedal in a direction such that the operation amount of the accelerator pedal returns to zero in a case where the steering wheel is pushed back forward in a state in which the steering wheel is displaced toward the vehicle rearward side.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
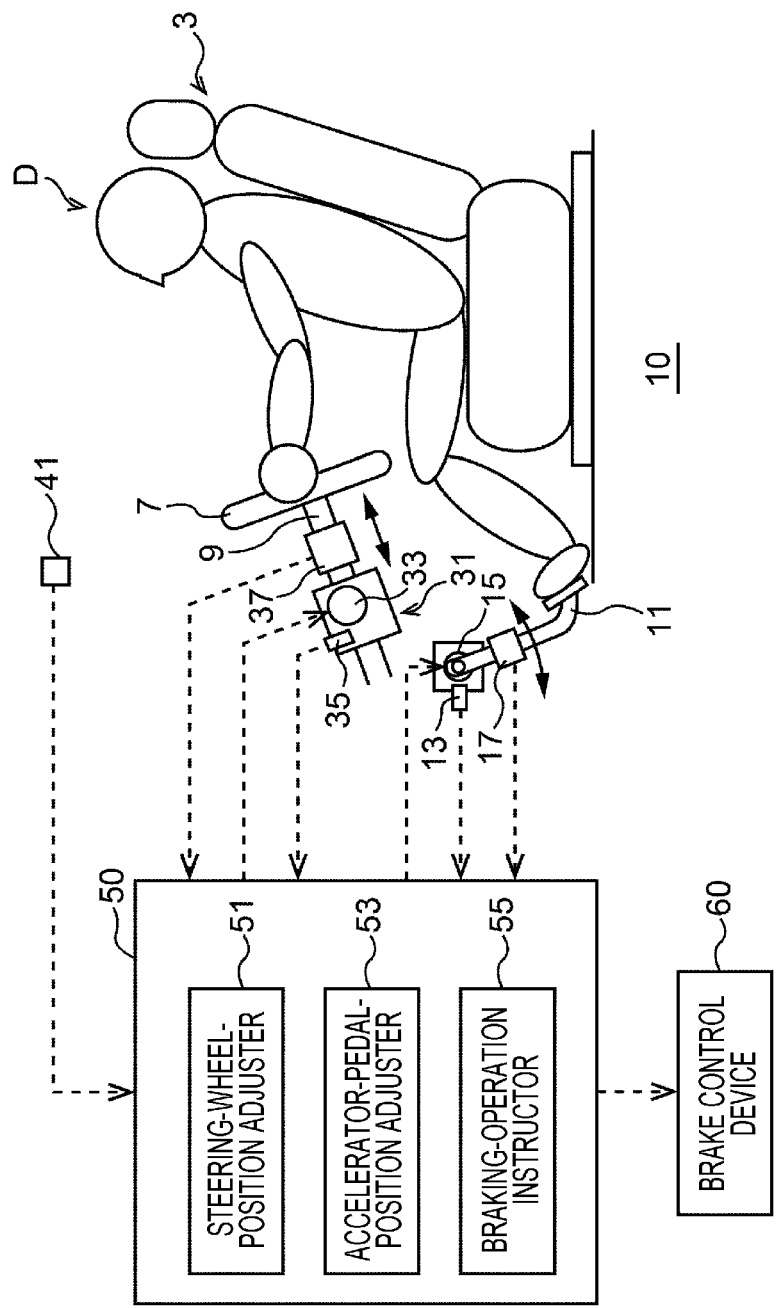
FIG. 1 is a schematic view illustrating an example configuration of a pedal-application-error accident preventing device according to an embodiment of the disclosure.

The drive control device disclosed in JP-A No. 2013-233893 outputs an engine-torque-reducing instruction or a brake-activating instruction when a driver mistakenly applies the accelerator pedal instead of the brake pedal and a load exceeding a load applied to a backrest during normal driving is applied to the backrest. Therefore, the engine-torque-reducing instruction or the brake-activating instruction may be output at a timing after sharp acceleration of the vehicle has occurred, which is too late to prevent an accident.

The misapplication preventing devices disclosed in JP-A No. 2014-048742 and WO No. 2015/020152 do not have a function of returning an operation on an accelerator to the original if the driver panics in an emergency and the hands of the driver stiffen in a state in which the accelerator is operated. Therefore, the misapplication preventing devices may not be capable of suppressing or preventing an accident if the driver mistakenly operates the accelerator. Moreover, the misapplication preventing devices disclosed in JP-A No. 2014-048742 and WO No. 2015/020152 have a problem in that the driver is expected to get used to the driving operation, because the operation of the accelerator differs from that of existing accelerators.

It is desirable to provide a pedal-application-error preventing device that can suppress occurrence of an accident due to misapplication of a brake pedal and an accelerator pedal.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. First Embodiment

First, a pedal-application-error accident preventing device according to a first embodiment of the disclosure will be described.

1-1. Overview

The pedal-application-error accident preventing device according to the present embodiment is a device that suppresses an accident that occurs when a driver panics while driving a vehicle and depresses an accelerator pedal in a situation in which the driver is expected to depress a brake pedal and the vehicle accelerates, or that softens the impact of the accident. The pedal-application-error accident preventing device is configured as a device that suppresses a pedal misapplication accident by utilizing human behavioral principle that is called "sub-gravity sensation", which is known mainly in aeronautical field and the like. For example, it is known that a person in a panic tilts his/her head rearward and sticks his/her arms forward. By utilizing the action of sticking arms forward, the pedal-application-error accident preventing device prevents depression of the accelerator pedal by providing a reaction force against depression of the accelerator pedal. The pedal-application-error accident preventing device according to the first embodiment includes sensors and electric control equipment.

1-2. Example Configuration

FIG. 1 is a schematic view illustrating an example configuration of a pedal-application-error accident preventing device 10 according to the present embodiment. FIG. 1 illustrates a state in which a driver D in a driver's seat 3 is driving a vehicle.

The pedal-application-error accident preventing device 10 according to the present embodiment includes, as equipment attached to a steering wheel 7, a steering-wheel-position changing mechanism 31 that displaces the steering wheel 7 in the vehicle forward-rearward direction, a steering-wheel-position detector 35 that detects the position St_str of the steering wheel 7, and a force sensor 37 that detects a force F_str with which a driver D pushes the steering wheel 7.

The steering-wheel-position changing mechanism 31 is driven by a control device 50 and actively changes the position St_str of the steering wheel 7 in the vehicle forward-rearward direction. In the present embodiment, the steering-wheel-position changing mechanism 31 includes an electric motor 33, which is controlled by the control device 50, and a rack-and-pinion mechanism. The rack-and-pinion mechanism includes a pinion gear that is provided on an output shaft of the electric motor 33 and a rack that is fixed to a steering wheel shaft 9. The electric motor 33 can rotate in a normal direction and a reverse direction in accordance with the direction of flow of a supplied electric current. When the electric motor 33 is rotationally driven, the steering wheel shaft 9 is moved forward and rearward in the axial direction, and the position St_str of the steering wheel 7 changes. However, the configuration of the steering-wheel-position changing mechanism 31, which electrically adjusts the position of the steering wheel 7, is not limited to this example.

Figure 2:
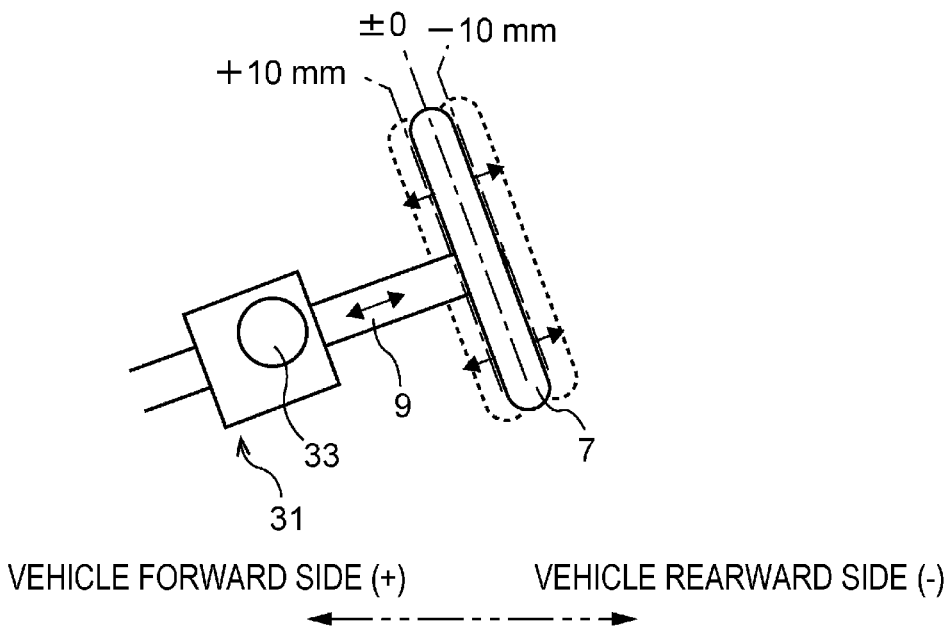
FIG. 2 illustrates an example of a movement range of a steering wheel.

FIG. 2 illustrates an example of a movement range of the steering wheel 7. The range in which the steering wheel 7 can displace is appropriately set so that a change in position of the steering wheel 7 does not give an unpleasant sensation to the driver D and so that safety does not decrease. For example, the steering-wheel-position changing mechanism 31 is displaceable by 10 mm in each of the vehicle forward direction and the vehicle rearward direction with respect to a reference position (±0 position), which is the position of the steering wheel 7 in a state in which the pedal-application-error accident preventing device 10 is switched off. FIG. 2 illustrates a movement range assuming that the vehicle forward direction is the positive direction. The movement range of the steering wheel 7 is not limited to ±10 mm.

In a state in which an electric current is not supplied to the electric motor 33, the position St_str of the steering wheel 7 changes when a force with which the driver D pushes the steering wheel 7 toward the vehicle forward side or pulls the steering wheel 7 toward the vehicle rearward side exceeds the rotational resistance of the electric motor 33.

The steering-wheel-position detector 35 detects the position St_str of the steering wheel 7 in the vehicle forward-rearward direction. The steering-wheel-position detector 35 may be, for example, a potentiometer that is provided in the electric motor 33 and detects the rotation angle of the electric motor 33, or a magnetic displacement sensor that detects the displacement amount of the steering wheel shaft 9 or the rack. The force sensor 37 detects the force F_str with which the driver D pushes the steering wheel 7. The force sensor 37 may be, for example, a strain gauge or an electrostriction sensor. Sensor signals of the steering-wheel-position detector 35 and the force sensor 37 are transmitted to the control device 50.

The pedal-application-error accident preventing device 10 further includes, as equipment provided to the accelerator pedal 11, an actuator 15 that adjusts the operation amount (depression amount) θa of the accelerator pedal 11, an accelerator-pedal-position detector 13 that detects the operation amount θa of the accelerator pedal 11, and a depressing-force sensor 17 that detects a pedal-depressing force F_acc with which the driver D depresses the accelerator pedal 11.

The actuator 15 is driven by the control device 50 and actively moves the accelerator pedal 11 in a direction such that at least the operation amount θa of the accelerator pedal 11 is returned to zero. The actuator 15 may be, for example, an electric motor that is coupled to the rotation shaft of the accelerator pedal 11 coaxially or via a gear. However, a configuration that enables the operation amount θa of the accelerator pedal 11 to be electrically adjustable is not limited to this example.

The accelerator-pedal-position detector 13 detects the operation amount θa of the accelerator pedal 11. The accelerator-pedal-position detector 13 may be, for example, a potentiometer that is provided in the actuator 15 and detects the rotation angle of the electric motor, or a rotation sensor that detects the rotation angle of the rotation shaft of the accelerator pedal 11. The depressing-force sensor 17 detects the pedal-depressing force F_acc with which the driver D depresses the accelerator pedal 11. The depressing-force sensor 17 may be, for example, a strain gauge or an electrostriction sensor. Sensor signals of the accelerator-pedal-position detector 13 and the depressing-force sensor 17 are transmitted to the control device 50.

The control device 50 includes one or more processors, such as a central processing unit (CPU) or a digital signal processor (DSP). The control device 50 includes one or more memories that can communicate with the processor, such as a random access memory (RAM), a read only memory (ROM), and the like. Each memory stores a software program to be executed by the processor, various parameters to be used for calculation, obtained data, calculation results, and the like. The processor performs predetermined calculation by executing a program stored in the memory, and controls the operation amounts of the steering-wheel-position changing mechanism 31 and the accelerator pedal 11.

The control device 50 includes a steering-wheel-position adjuster 51, an accelerator-pedal-position adjuster 53, and a braking-operation instructor 55. A part or the entirety of each of these may be a function that is realized when a processor executes a program to perform predetermined processing. The control device 50 is capable of obtaining signals that are output from a system activation switch 41, the accelerator-pedal-position detector 13, the depressing-force sensor 17, the steering-wheel-position detector 35, and the force sensor 37. The system activation switch 41 is operated by the driver D or the like to switch between activation and deactivation of the pedal-application-error accident preventing device 10.

Steering-Wheel-Position Adjuster

Figure 3:
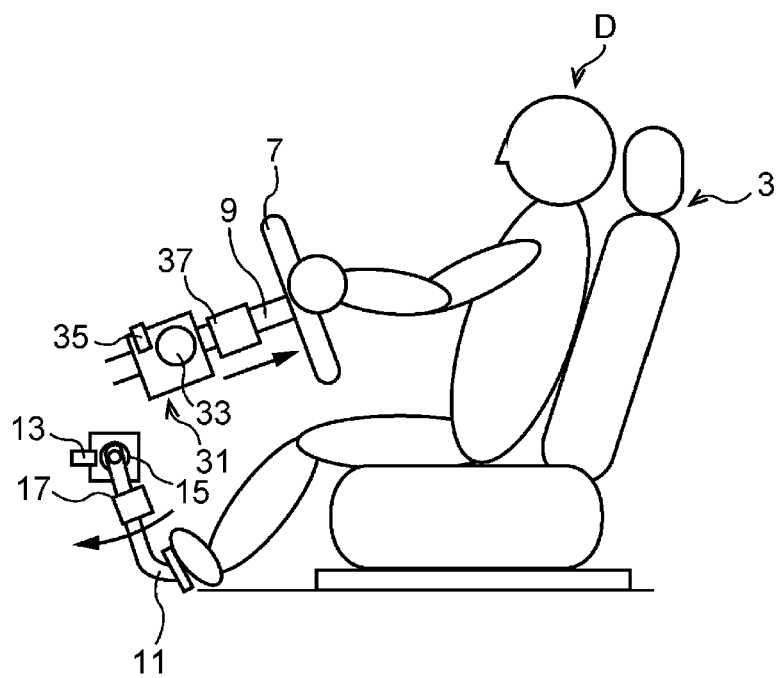
FIG. 3 illustrates how a steering wheel displaces toward the vehicle rearward side as the operation amount of an accelerator pedal increases.

The steering-wheel-position adjuster 51 displaces the steering wheel 7 (see FIG. 3) in accordance with the operation amount θa of the accelerator pedal 11, which is operated by the driver D, so that the steering wheel 7 is positioned further toward the vehicle rearward side as the operation amount θa of the accelerator pedal 11 increases. In the present embodiment, the steering-wheel-position adjuster 51 controls driving of the electric motor 33 of the steering-wheel-position changing mechanism 31 based on the operation amount θa of the accelerator pedal 11 detected by the accelerator-pedal-position detector 13.

The steering-wheel-position adjuster 51 does not supply an electric current to the electric motor 33 or supplies a constant electric current to the electric motor 33 in a state in which the accelerator pedal 11 is not depressed, that is, a state in which the operation amount θa of the accelerator pedal 11 is zero. Thus, in a state in which the accelerator pedal 11 is not depressed, the steering wheel 7 is held at a reference position (the ±0 position in FIG. 2) St_str_0. The steering-wheel-position adjuster 51 displaces the steering wheel 7 toward the vehicle rearward side (the (−) direction in FIG. 2) as the operation amount θa of the accelerator pedal 11 increases. This creates a situation in which the steering wheel 7 is returned to the reference position St_str_0 due to the driver D's action of sticking his/her arms forward while depressing the accelerator pedal 11.

The steering-wheel-position adjuster 51 may have a function of performing control so that the steering wheel 7 does not displace in the vehicle forward-rearward direction in a state in which the pedal-application-error accident preventing device 10 is switched off. For example, the steering-wheel-position adjuster 51 may hold the steering wheel 7 at the reference position St_str_0 by supplying a constant electric current to the electric motor 33 while the system activation switch 41 is off. However, a unit for holding the steering wheel 7 at the reference position St_str_0 in a state in which the pedal-application-error accident preventing device 10 is switched off is not limited to the above example. For example, the control device 50 may activate a locking mechanism that prohibits action of the steering-wheel-position changing mechanism 31 while the system activation switch 41 is off by, for example, causing a stopper to be engaged with the rack-and-pinion mechanism of the steering-wheel-position changing mechanism 31.

Figure 4:
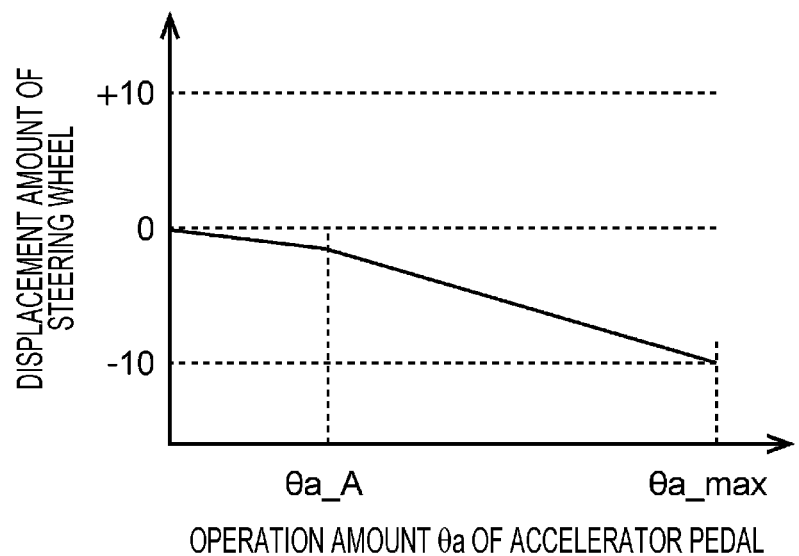
FIG. 4 illustrates a map in which the relationship between the operation amount of the accelerator pedal and the displacement amount of the steering wheel is set.

FIG. 4 illustrates an example of a map in which the relationship between the operation amount θa of the accelerator pedal 11 and the displacement amount of the steering wheel 7 is set. The steering-wheel-position adjuster 51 displaces the steering wheel 7 toward the vehicle rearward side as the operation amount θa of the accelerator pedal 11 increases. The example illustrated in FIG. 4 is a case where a mechanical dead zone or a control dead zone is provided between the rotational action of the accelerator pedal 11 the opening/closing action of the intake throttle. In the example illustrated in FIG. 4, from the time when the accelerator pedal 11 is started to be depressed to the time when the operation amount θa of the accelerator pedal 11 reaches a predetermined operation amount θa_A, the position St_str of the steering wheel 7 gradually changes toward the vehicle rearward side as the operation amount θa of the accelerator pedal 11 increases. After the operation amount θa of the accelerator pedal 11 has exceeded predetermined operation amount θa_A, until the operation amount θa reaches the maximum operation amount θa_max, the ratio of the displacement of the steering wheel 7 to the change of the operation amount θa of the accelerator pedal 11 is relatively high compared with that of a case where the operation amount θa of the accelerator pedal 11 is less than or equal to the predetermined operation amount θa_A.

However, the relationship between the operation amount θa of the accelerator pedal 11 and the displacement amount of the steering wheel 7 is not limited to the example illustrated in FIG. 4. For example, the operation amount θa of the accelerator pedal 11 at which the position St_str of the steering wheel 7 starts to change, the operation amount θa of the accelerator pedal 11 at which the displacement amount of the steering wheel 7 toward the vehicle rearward side becomes the maximum, and the displacement amount of the steering wheel 7 (displacement velocity and hysteresis) with respect to change in the operation amount θa of the accelerator pedal 11 are appropriately set in accordance with the following: setting of the opening/closing action of the intake throttle with respect to the rotational action of the accelerator pedal 11; the reaction force of the return spring of the accelerator pedal 11; and vehicle characteristics such as the static friction of the steering-wheel-position changing mechanism 31. Thus, it is possible to prevent sharp increase of the operation amount θa of the accelerator pedal 11 caused by the driver D or vibration of the steering wheel 7 due to sharp increase of the operation amount θa of the accelerator pedal 11 unintended by the driver D. Moreover, because the operational feeling of the accelerator pedal 11 using a foot is mainly dependent on the reaction force of the pedal, by appropriately setting the relationship between the operation amount θa of the accelerator pedal 11 and the displacement amount of the steering wheel 7, it is possible to apply, to the driver's hand, a reaction force that is equivalent to a reaction force received by the foot and thus the operational feeling felt by foot and the operational feeling felt by hand can be made close to each other.

The steering-wheel-position adjuster 51 stops driving the electric motor 33 of the steering-wheel-position changing mechanism 31 or reduces the driving torque of the electric motor 33, while the accelerator-pedal-position adjuster 53 drives the actuator 15 to adjust the operation amount θa of the accelerator pedal 11. In the example of the present embodiment, the steering-wheel-position adjuster 51 stops driving the electric motor 33 when the force F_str with which the driver D pushes the steering wheel 7, which is detected by the force sensor 37, exceeds a preset threshold F_str_0. Thus, the steering wheel 7 is prevented from being returned toward the vehicle forward side due to the driver D's action of sticking his/her arms in a case where, for example, the driver D detects a risk of collision, and it is possible to allow the accelerator-pedal-position adjuster 53 to efficiently perform an action of returning the operation amount θa of the accelerator pedal 11 to zero.

The steering-wheel-position adjuster 51 may control driving of the electric motor 33 of the steering-wheel-position changing mechanism 31 based on the pedal-depressing force F_acc of the accelerator pedal 11 detected by the depressing-force sensor 17. For example, in a state in which the driver D is depressing the accelerator pedal 11, the pedal-depressing force F_acc of the accelerator pedal 11 has a value corresponding to the reaction force of the return spring of the accelerator pedal 11. Accordingly, the steering-wheel-position adjuster 51 changes the position St_str of the steering wheel 7 in accordance with the operation amount θa of the accelerator pedal 11 when the pedal-depressing force F_acc of the accelerator pedal 11 exceeds a preset threshold F_acc_0. The threshold F_acc_0 is preset to an appropriate value greater than or equal to zero, in consideration of a force with which the driver D is expected to depress the accelerator pedal 11. Thus, for example, it is possible to respond to preference of some drivers D who do not like displacement of the steering wheel 7 during a normal (non-emergency) driving. On the other hand, it is possible to generate a force that displaces the steering wheel 7 rearward and to allow an action of the foot of the driver D to be felt by the hand of the driver D when the driver D mistakenly depresses the accelerator pedal 11 in an emergency.

The steering-wheel-position adjuster 51 may limit the velocity with which the position St_str of the steering wheel 7 is changed in accordance with the operation amount θa of the accelerator pedal 11, when the rate of change |ΔF_acc/dt| of the pedal-depressing force F_acc of the accelerator pedal 11 exceeds a preset threshold ΔF_acc/dt_A. The threshold ΔF_acc/dt_A is preset to an appropriate value that enables detection of a sharp increase and a sharp decrease of the pedal-depressing force F_acc of the accelerator pedal 11. Thus, it is possible to prevent vibration of the steering wheel 7 due to abrupt change in the operation amount θa of the accelerator pedal 11 caused by the driver D or abrupt change in the operation amount θa of the accelerator pedal 11 unintended by the driver D. The steering-wheel-position adjuster 51 may have a preset upper limit on the velocity at which the steering-wheel-position adjuster 51 changes the position St_str of the steering wheel 7.

The steering-wheel-position adjuster 51 may control driving of the electric motor 33 of the steering-wheel-position changing mechanism 31, instead of by using the depressing-force sensor 17, but based on an acceleration that is generated when the accelerator pedal 11 is depressed and that is detected by an acceleration sensor. In this case, the steering-wheel-position adjuster 51 may filter an input signal from the acceleration sensor by using a low-pass filter or the like, and the steering-wheel-position adjuster 51 may not change the position of the steering wheel 7 based on a rotational action of the accelerator pedal 11 exceeding a predetermined acceleration that cannot be generated by a normal driving operation by the driver D. Thus, it is possible to prevent vibration of the steering wheel 7 due to impulse-like input or high-frequency-vibration input unintended by the driver D.

The steering-wheel-position adjuster 51 may change the position St_str of the steering wheel 7 in accordance with the operation amount θa of the accelerator pedal 11, when an acceleration generated in response to change in the operation amount θa of the accelerator pedal 11 exceeds a preset threshold. Thus, for example, it is possible to respond to preference of some drivers D who do not like displacement of the steering wheel 7 during a normal (non-emergency) driving. On the other hand, it is possible to generate a force that displaces the steering wheel 7 rearward and to allow an action of the foot of the driver D to be felt by the hand of the driver D when the driver D mistakenly depresses the accelerator pedal 11 in an emergency.

Accelerator-Pedal-Position Adjuster

Figure 5:
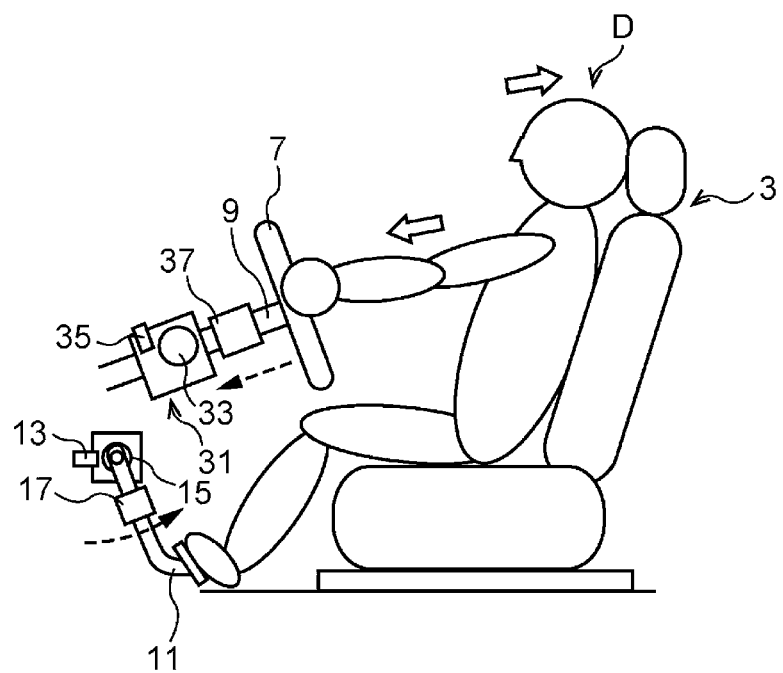
FIG. 5 illustrates how the accelerator pedal displaces in accordance with displacement of the steering wheel toward the vehicle forward side.

When the steering wheel 7 is pushed back forward in a state in which the steering wheel 7 is displaced toward the vehicle rearward side, the accelerator-pedal-position adjuster 53 displaces the accelerator pedal 11 in a direction such that the operation amount θa of the accelerator pedal 11 returns to zero (see FIG. 5). In the present embodiment, the accelerator-pedal-position adjuster 53 controls driving of the actuator 15, which adjusts the operation amount θa of the accelerator pedal 11, based on the position St_str of the steering wheel 7 detected by the steering-wheel-position detector 35. Thus, it is possible to return the operation amount θa of the accelerator pedal 11 to zero in accordance with the driver D's action of sticking his/her arms forward.

The accelerator-pedal-position adjuster 53 may control driving of the actuator 15 based on the position St_str of the steering wheel 7 and may adjust the operation amount θa of the accelerator pedal 11, when the force F_str, with which the driver D pushes the steering wheel 7, detected by the force sensor 37 exceeds a preset threshold F_str_0. The threshold F_str_0 may be preset to any appropriate value greater than or equal to 0. For example, the threshold F_str_0 is set to an appropriate value such that the force F_str does not exceed the threshold F_str_0 with a force with which the driver D pushes the steering wheel 7 during a normal driving operation. Thus, for example, it is possible to respond to preference of some drivers D who do not like link between the displacement of the steering wheel 7 and the displacement of the accelerator pedal 11 during a normal (non-emergency) driving. On the other hand, it is possible to prevent the accelerator pedal 11 from mistakenly depressed further when, for example, the driver D panics and sticks his/her arms forward in an emergency, by generating a force for returning the accelerator pedal 11 due to a change in the position St_str of the steering wheel 7. The accelerator-pedal-position adjuster 53 may filter an input signal from the force sensor 37 by using a low-pass filter or the like to prevent change in the operation amount θa of the accelerator pedal 11 when the force F_str that pushes the steering wheel 7 exceeds a predetermined value that cannot be generated in a normal driving operation by the driver D. Thus, it is possible to prevent vibration of the steering wheel 7 due to impulse-like input or high-frequency-vibration input unintended by the driver D.

The accelerator-pedal-position adjuster 53 may control driving of the actuator 15, instead of by using the force sensor 37, but based on an acceleration that is generated when the position St_str of the steering wheel 7 changes and that is detected by an acceleration sensor. For example the accelerator-pedal-position adjuster 53 may change the operation amount θa of the accelerator pedal 11 in accordance with the position St_str of the steering wheel 7, when an acceleration that is generated when the position St_str of the steering wheel 7 changes exceeds a preset threshold. The threshold may be set at any appropriate value greater than or equal to 0. For example, the threshold may set to an appropriate value so that the acceleration does not exceed the threshold with a force with which the driver D pushes the steering wheel 7 during a normal driving operation. Thus, for example, it is possible to respond to preference of some drivers D who do not like link between the displacement of the steering wheel 7 and the displacement of the accelerator pedal 11 during a normal (non-emergency) driving. On the other hand, it is possible to prevent the accelerator pedal 11 from mistakenly depressed further when, for example, the driver D panics and sticks his/her arms forward in an emergency, by generating a force for returning the accelerator pedal 11 due to a change in the position St_str of the steering wheel 7. The accelerator-pedal-position adjuster 53 may filter an input signal from the acceleration sensor by using a low-pass filter or the like to prevent change in the operation amount θa of the accelerator pedal 11 based on a change in the position St_str of the steering wheel 7 that cannot be generated in a normal driving operation by the driver D. Thus, it is possible to prevent vibration of the steering wheel 7 due to impulse-like input or high-frequency-vibration input unintended by the driver D.

For example, the accelerator-pedal-position adjuster 53 may adjust the operation amount θa of the accelerator pedal 11 based on the position St_str of the steering wheel 7 by using the map illustrated in FIG. 4, or may adjust the operation amount θa of the accelerator pedal 11 based on the position St_str of the steering wheel 7 by using a different map.

Braking-Operation Instructor

The braking-operation instructor 55 generates an instruction signal for generating a braking force in a vehicle as the steering wheel 7 is further pushed forward after the operation amount θa of the accelerator pedal 11 has been returned to zero by the accelerator-pedal-position adjuster 53. The braking-operation instructor 55 has a function of further generating a braking force in a vehicle, in contrast to the accelerator-pedal-position adjuster 53, which has the function of returning the operation amount θa of the accelerator pedal 11 to zero and suppressing acceleration of the vehicle in accordance with the driver D's action of sticking his/her arms forward.

For example, the steering wheel 7 is positioned at the reference position (±0 position in FIG. 2) St_str_0 when the accelerator-pedal-position adjuster 53 returns the operation amount θa of the accelerator pedal 11 to zero based on the map illustrated in FIG. 4. In this case, the braking-operation instructor 55 generates an instruction signal for generating a braking force and transmits the instruction signal to a brake control device 60 when the steering wheel 7 displaces further toward the vehicle forward side (the (+) side in FIG. 2) from the reference position St_str_0. When receiving the instruction signal, the brake control device 60 generates a braking force to decelerate the vehicle. The brake control device 60 may generate a braking force by driving a hydraulic brake device, or may generate a braking force by regeneratively driving a motor that drives the wheel.

The target value of a braking force to be generated may be a constant value. However, when the position St_str of the steering wheel 7 is changed further toward the vehicle forward side than the reference position St_str_0, the braking-operation instructor 55 may increase the target value of a braking force to be generated as the change in the position St_str of the steering wheel 7 relative to the reference position St_str_0 increases. Thus, it is possible to increase the braking force in accordance with the degree of panic that can be inferred from the driver D's action of sticking his/her arms forward.

The timing at which the braking-operation instructor 55 starts transmitting an instruction signal to the brake control device 60 to generate a braking force is not limited to a time after the operation amount θa of the accelerator pedal 11 has been returned to zero. The braking-operation instructor 55 may start transmitting the instruction signal to the brake control device 60 before the operation amount θa of the accelerator pedal 11 returns to zero. In other words, the braking-operation instructor 55 may start transmitting the instruction signal to the brake control device 60 before the steering wheel 7 is returned to reference position St_str_0.

1-3. Action

Next, an action of the pedal-application-error accident preventing device 10 according to the present embodiment will be described.

Figure 6:
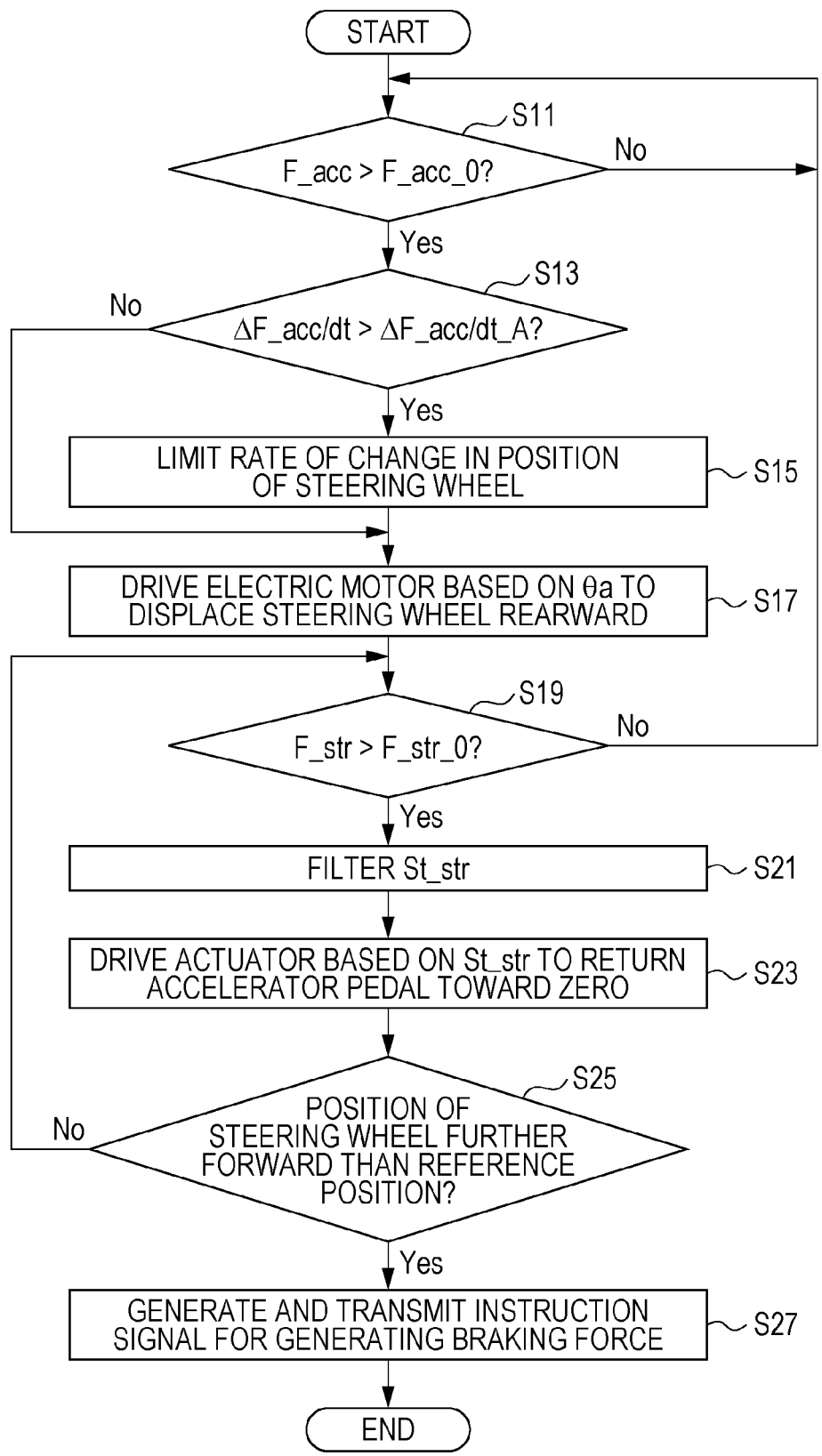
FIG. 6 is a flowchart illustrating an example action of the pedal-application-error accident preventing device according to the embodiment.

FIG. 6 is a flowchart illustrating the action of the control device 50 of the pedal-application-error accident preventing device 10. The flowchart described below may be constantly performed while the system of a vehicle is active. However, in the present embodiment, the flowchart is performed while the system activation switch 41 is turned on.

First, the steering-wheel-position adjuster 51 determines whether the pedal-depressing force F_acc of the accelerator pedal 11, which is detected based on a sensor signal of the depressing-force sensor 17, exceeds a preset threshold F_acc_0 (step S11). The threshold F_acc_0 may have any appropriate value that is greater than or equal to zero and that is preset in consideration of a tread force that the driver D is expected to depress the accelerator pedal 11. If the detected pedal-depressing force F_acc is less than or equal to the threshold F_acc_0 (S11/No), the steering-wheel-position adjuster 51 repeats the determination in step S11.

On the other hand, if the detected pedal-depressing force F_acc exceeds the threshold F_acc_0 (S11/Yes), the steering-wheel-position adjuster 51 determines whether the rate of change |ΔF_acc/dt| of the pedal-depressing force F_acc of the accelerator pedal 11 exceeds the preset threshold ΔF_acc/dt_A (step S13). The threshold ΔF_acc/dt_A is preset to a value that enables detection of a sharp change in the pedal-depressing force F_acc of the accelerator pedal 11. If the rate of change |ΔF_acc/dt| of the pedal-depressing force F_acc of the accelerator pedal 11 does not exceed the threshold ΔF_acc/dt_A (S13/No), the process proceeds to step S17.

On the other hand, when the rate of change |ΔF_acc/dt| of the pedal-depressing force F_acc of the accelerator pedal 11 exceeds the threshold ΔF_acc/dt_A (S13/Yes), the steering-wheel-position adjuster 51 limits the rate of change in the position of the steering wheel 7 due to the steering-wheel-position changing mechanism 31 (step S15). That is, the steering-wheel-position adjuster 51 limits the rate of change in the position of the steering wheel 7 so that the steering wheel 7 does not vibrate as a result of a sharp change in the position St_str of the steering wheel 7 when, for example, the pedal-depressing force F_acc of the accelerator pedal 11 sharply changes. In one example, the steering-wheel-position adjuster 51 limits the rotation velocity of the electric motor 33 of the steering-wheel-position changing mechanism 31.

Next, the steering-wheel-position adjuster 51 control driving of the electric motor 33 of the steering-wheel-position changing mechanism 31 based on the operation amount θa of the accelerator pedal 11 detected based on a sensor signal of the accelerator-pedal-position detector 13, and changes the position St_str of the steering wheel 7 toward the vehicle rearward side (step S17). For example, the steering-wheel-position adjuster 51 refers to the map illustrated in FIG. 4, and controls driving of the electric motor 33 so that the steering wheel 7 is positioned further toward the vehicle rearward side as the operation amount θa of the accelerator pedal 11 increases. This creates a situation in which the steering wheel 7 is moved forward when the driver D takes an action of sticking his/her arms forward.

Next, the accelerator-pedal-position adjuster 53 determines whether the force F_str with which the driver D pushes the steering wheel 7, which is detected based on a sensor signal of the force sensor 37, exceeds the preset threshold F_str_0 (step S19). The threshold F_str_0 has any appropriate value that is greater than or equal to 0 and that is preset so that the force F_str with which the driver D pushes the steering wheel 7 during a normal driving operation does not exceed the threshold F_str_0. If the detected force F_str is less than or equal to the threshold F_str_0 (S19/No), the process returns to step S11, and the steering-wheel-position adjuster 51 continues adjustment of the position St_str of the steering wheel 7 based on the operation amount θa of the accelerator pedal 11.

On the other hand, if the detected the force F_str exceeds the threshold F_str_0 (S19/Yes), the accelerator-pedal-position adjuster 53 filters a sensor signal of the steering-wheel-position detector 35 by using a low-pass filter (step S21). Thus, it is possible to prevent vibration of the accelerator pedal 11 due to fluctuation of the position St_str of the steering wheel 7 unintended by the driver D. Next, the accelerator-pedal-position adjuster 53 drives the actuator 15, which adjusts the operation amount θa of the accelerator pedal 11, to return the operation amount θa of the accelerator pedal 11 toward zero based on the position St_str of the steering wheel 7 detected based on the filtered signal (step S23). For example, the accelerator-pedal-position adjuster 53 refers to the map illustrated in FIG. 4 to adjust the operation amount θa of the accelerator pedal 11 based on the position St_str of the steering wheel 7. Thus, it is possible to prevent the accelerator pedal 11 from being depressed when, for example, the driver D panics and takes an action of sticking his/her arms forward. Moreover, it is possible to cause the driver D's hand to feel a reaction force against depression of the accelerator pedal 11 by the driver D, and to allow the driver D to recognize that he/she is performing a misoperation. Thus, it is also possible to expect that the driver D recovers from the panic.

Next, the braking-operation instructor 55 determines whether the position St_str of the steering wheel 7 is further forward than the reference position St_str_0 (step S25). If the position St_str of the steering wheel 7 is not further forward than the reference position St_str_0 (S25/No), the process returns to step S19, and the accelerator-pedal-position adjuster 53 determines whether the force F_str with which the driver D pushes the steering wheel 7 exceeds a preset threshold F_str_0.

On the other hand, if the position St_str of the steering wheel 7 is further forward than the reference position St_str_0 (step S25/Yes), the braking-operation instructor 55 generates an instruction signal for generating a braking force of the vehicle and transmits the instruction signal to the brake control device 60 (step S27). For example, the braking-operation instructor 55 sets a larger target value of a braking force to be generated as the distance between the position St_str of the steering wheel 7, which is further forward than the reference position St_str_0, and the reference position St_str_0 is larger, and transmits the instruction signal. Thus, the brake control device 60 generates a braking force of the vehicle, and the vehicle decelerates.

1-4. Operational Effects

Next, the operational effects of the pedal-application-error accident preventing device 10 according to the present embodiment will be described.

Figure 7:
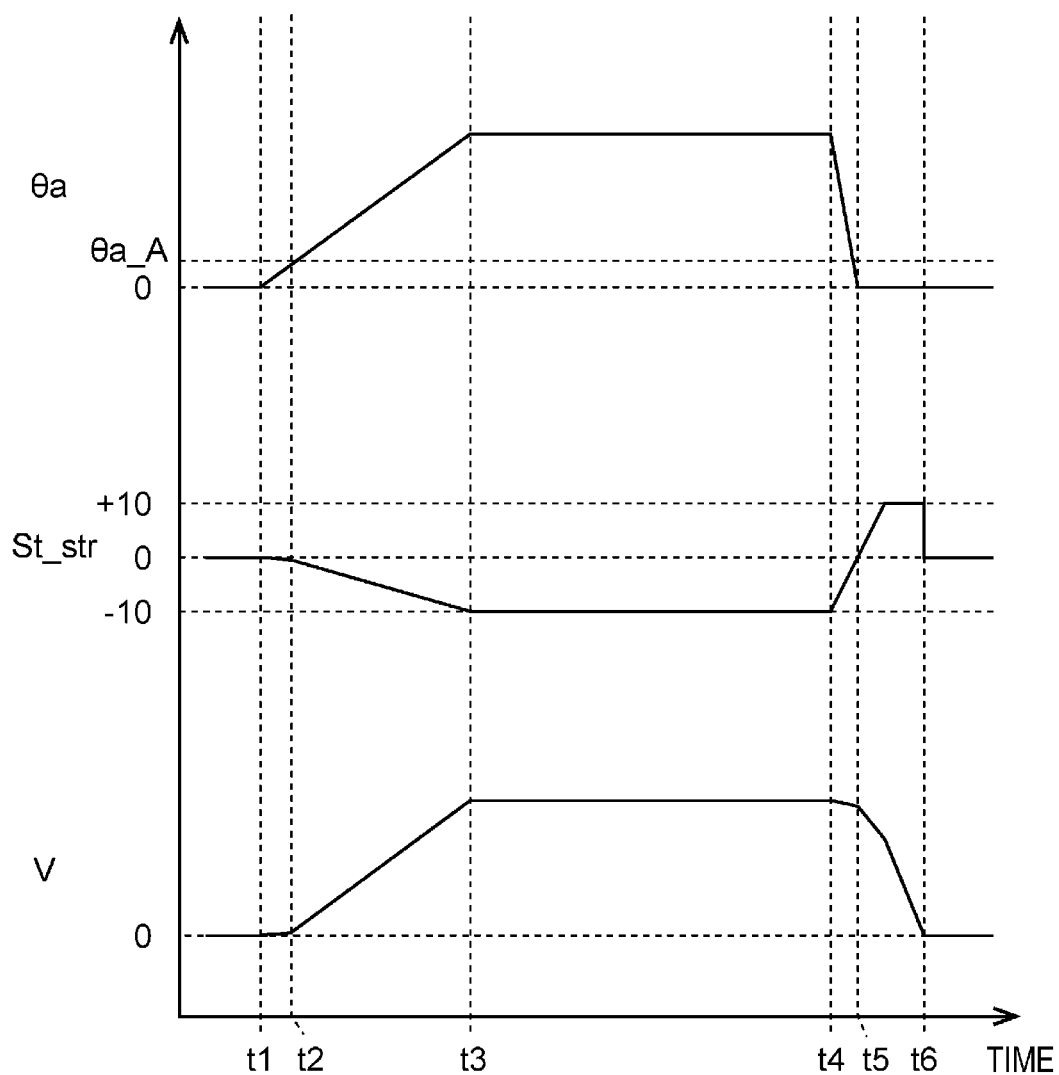
FIG. 7 illustrates an operation of the pedal-application-error accident preventing device according to the embodiment.

FIG. 7 illustrates an example of changes of the operation amount θa of the accelerator pedal 11, the position St_str of the steering wheel 7, and vehicle velocity V while the pedal-application-error accident preventing device 10 is operating.

In the example illustrated in FIG. 7, in a period from time t1 when the driver D starts to depress the accelerator pedal 11 to time t2 when the intake throttle starts to be opened, the position St_str of the steering wheel 7 gradually changes toward the vehicle rearward side (negative side) as the operation amount θa of the accelerator pedal 11 increases (see FIG. 4). The vehicle velocity V does not increase in this period.

At time t2, the intake throttle starts to be opened. Thereafter, the rate of change in the position St_str of the steering wheel 7 increases in accordance with increase in the operation amount θa of the accelerator pedal 11 (see FIG. 4). As the operation amount θa of the accelerator pedal 11 increases, the vehicle velocity V increases.

Subsequently, at time t3, the driver D stops depressing the accelerator pedal 11, and the operation amount θa of the accelerator pedal 11 is held at a constant value. Then, the vehicle velocity V is also held at a constant value.

It is assumed that, at time t4, an emergency, such as running out of another vehicle or a pedestrian in front of the vehicle, occurs, and the driver D panics and takes an action of sticking his/her arms forward. Then, the steering wheel 7 is pushed forward, and the position St_str of the steering wheel 7 starts to change toward the forward side. In accordance with this, a reaction force against depression of the accelerator pedal 11 by the driver is generated, the accelerator pedal 11 displaces in a direction such that the operation amount θa of the accelerator pedal 11 returns to zero, and the vehicle velocity V starts to decrease. At this time, even if the driver D panics and mistakenly takes an action of depressing the accelerator pedal 11 instead of the brake pedal, it is possible to prevent acceleration of the vehicle because the accelerator pedal 11 is returned due to the driver D's action of sticking his/her arms forward. Moreover, it is possible to cause the driver D to feel a reaction force against depression of the accelerator pedal 11 by the driver D, and to allow the driver D to recognize that he/she is performing a misoperation. Thus, it is also possible to expect that the driver D recovers from the panic.

Next, at time t5, the position St_str of the steering wheel 7 is returned to the reference position St_str_0, and, in accordance with this, the operation amount θa of the accelerator pedal 11 becomes zero. In the present embodiment, if the steering wheel 7 is pushed further forward than the reference position St_str_0 after time t5, a braking force is generated in the vehicle, and the vehicle is stopped at time t6.

1-5. Advantageous Effects

As described above, the pedal-application-error accident preventing device 10 according to the present embodiment changes the position St_str of the steering wheel 7 toward the vehicle rearward side when the accelerator pedal 11 is depressed, and creates a state in which the steering wheel 7 can be moved forward when the driver D takes an action of sticking his/her arms forward. Moreover, when, for example, the driver D panics in an emergency and takes the action of sticking his/her arms forward, the pedal-application-error accident preventing device 10 displaces the accelerator pedal 11 in a direction such that the operation amount θa of the accelerator pedal 11 returns to zero as the steering wheel 7 is pushed forward. Accordingly, in an emergency, a reaction force against the action of the driver D of depressing the accelerator pedal 11 is generated, and it is possible to prevent the driver D from further depressing the accelerator pedal 11. Moreover, it is possible to cause the driver D to feel a reaction force against depression of the accelerator pedal 11 by the driver D, and to allow the driver D to recognize that he/she is performing a misoperation. Thus, it is also possible to expect that the driver D recovers from the panic. Furthermore, it is possible to decelerate the vehicle because, as the steering wheel 7 is pushed forward, the accelerator pedal 11 displaces in a direction such that the operation amount θa of the accelerator pedal 11 returns to zero. In this way, the pedal-application-error accident preventing device 10 according to the present embodiment can suppress an accident or lessen the impact of an accident due to misapplication of the accelerator pedal 11 by utilizing an action that the driver D takes in a panic.

Moreover, when the steering wheel 7 is pushed further forward than the reference position St_str_0, the pedal-application-error accident preventing device 10 according to the present embodiment transmits an instruction signal, for generating a braking force, to the brake control device 60. Accordingly, it is possible to actively decelerate the vehicle and to increase the effect of suppressing the accident due to misapplication of the accelerator pedal 11 or lessening the impact due to the accident.

Moreover, in the pedal-application-error accident preventing device 10 according to the present embodiment, the steering-wheel-position adjuster 51 stops the action of changing the position St_str of the steering wheel 7 based on the operation amount θa of the accelerator pedal 11 or reduces the driving torque of the electric motor 33, if the force F_str with which the driver D pushes the steering wheel 7 forward exceeds the predetermined threshold F_str_0. Thus, when the driver D exhibits a behavior of sticking his/her arms forward, the action of returning the steering wheel 7 toward the vehicle forward side is not hindered, and it is possible to allow the accelerator-pedal-position adjuster 53 to efficiently perform the action of returning the operation amount θa of the accelerator pedal 11 to zero.

1-6. Application Example

Next, an application example of the pedal-application-error accident preventing device 10 according to the above embodiment will be described.

The pedal-application-error accident preventing device 10 according to the above embodiment is structured as a device such that the operation amount θa of the accelerator pedal 11 and the position St_str of the steering wheel 7 are linked. Moreover, the position St_str of the steering wheel 7 and the operation amount θb of the brake pedal may be linked.

The pedal-application-error accident preventing device according to the application example further includes an actuator that displaces the brake pedal and a brake-pedal-position adjuster that controls driving the actuator that displaces the brake pedal. On the other hand, in the pedal-application-error accident preventing device according to the application example, the braking-operation instructor 55, among the functional units of the control device 50, can be omitted. The actuator that displaces the brake pedal may be an electric motor, as with the actuator 15 that displaces the accelerator pedal 11. The brake-pedal-position adjuster is provided as a function of the control device 50.

The brake-pedal-position adjuster displaces the brake pedal in a direction such that the operation amount θb of the brake pedal increases by driving the actuator when the steering wheel 7 is pushed back forward in a state in which the steering wheel 7 is displaced toward the vehicle rearward side by the steering-wheel-position adjuster 51. In this case, the braking-operation instructor 55 of the control device 50 in the above embodiment is not necessary, and the brake system can operate based on the operation amount θb of brake pedal and generate a braking force. In the application example, it is possible to appropriately set the position St_str of the steering wheel 7 at which the operation amount θb of the brake pedal is started to be increased when the steering wheel 7 is returned toward the vehicle forward side.

When the driver D's takes an action of sticking his/her arms forward in a state in which the accelerator pedal 11 is depressed in a state in which the steering wheel 7 is displaced toward the vehicle rearward side, the pedal-application-error accident preventing device according to the application example generates a reaction force against depression of the accelerator pedal 11 to suppress further depression of the accelerator pedal 11, returns the operation amount θa of the accelerator pedal 11 to zero, and increases the operation amount θb of the brake pedal to generates a braking force in the vehicle. Accordingly, by increasing the operation amount θb of the brake pedal by utilizing action that the driver D takes in a panic, it is possible to suppress an accident due to misapplication of the accelerator pedal 11 and to alleviate the impact due to the accident.

2. Second Embodiment

Next, a pedal-application-error accident preventing device according to a second embodiment of the disclosure will be described.

In contrast to the pedal-application-error preventing device according to the first embodiment, which includes sensors and electric control devices, the pedal-applicationerror preventing device according to the second embodiment includes a mechanical mechanism that does not have electric control devices.

Figure 8:
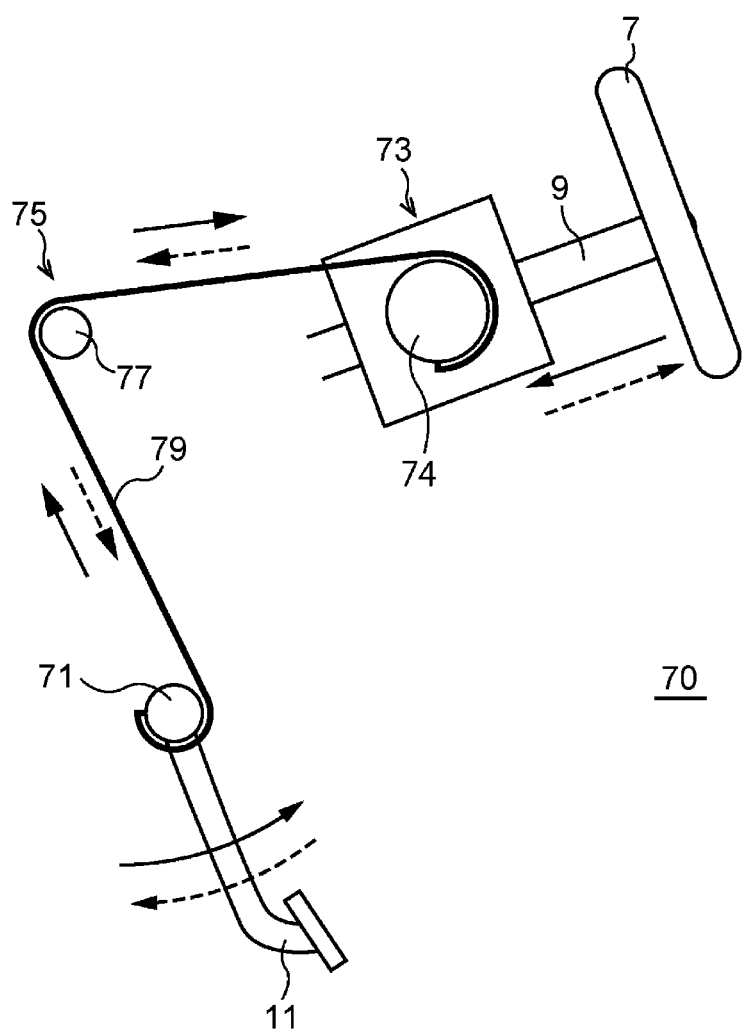
FIG. 8 is a schematic view illustrating an example configuration of a first transmission mechanism of a pedal-application-error accident preventing device according to an embodiment of the disclosure.
Figure 9:
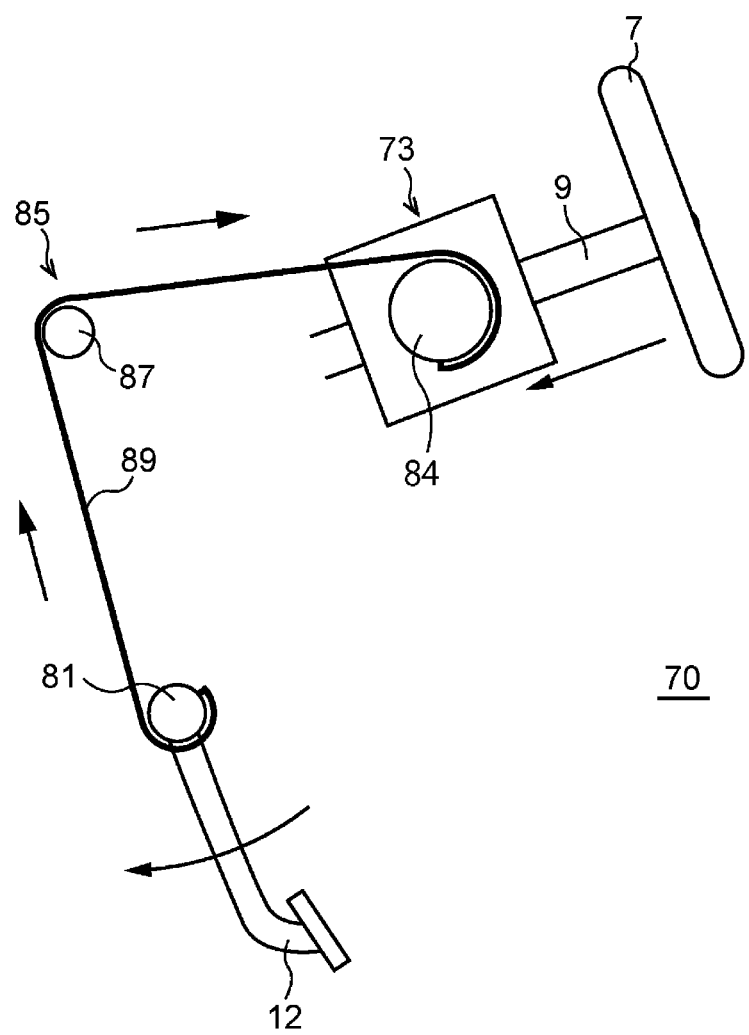
FIG. 9 is a schematic view illustrating an example configuration of a second transmission mechanism of the pedal-application-error accident preventing device according to the embodiment of the disclosure.

FIG. 8 and FIG. 9 are schematic views each illustrating a pedal-application-error accident preventing device 70 according to the present embodiment. FIG. 8 illustrates an example of a first transmission mechanism 75 that moves the steering wheel 7 toward the vehicle rearward side by transmitting, to a steering-wheel-position changing mechanism 73, an action of a movable part of the accelerator pedal 11 due to increase in the operation amount θa of the accelerator pedal 11. FIG. 9 illustrates an example of a second transmission mechanism 85 that increases the operation amount of a brake pedal 12 by transmitting, to a movable part of brake pedal 12, an action of the steering-wheel-position changing mechanism 73 due to movement of the steering wheel 7 toward the vehicle forward side.

In the pedal-application-error accident preventing device 70, the steering-wheel-position adjuster and the accelerator-pedal-position adjuster respectively include the first transmission mechanism 75 and the second transmission mechanism 85. The first transmission mechanism 75 moves the steering wheel 7 toward the vehicle-backward side by transmitting, to the steering-wheel-position changing mechanism 73, an action of a movable part of the accelerator pedal 11 due to increase in the operation amount θa of the accelerator pedal 11. The first transmission mechanism 75 displaces the accelerator pedal 11 in a direction such that the operation amount θa of the accelerator pedal 11 returns to zero by transmitting, to a movable member, an action of the steering-wheel-position changing mechanism 73 when the steering wheel 7 is pushed back forward in a state in which the steering wheel 7 is displaced toward the vehicle rearward side.

The first transmission mechanism 75 illustrated in FIG. 8 includes a first pulley 71, a second pulley 74, an intermediate pulley 77, and a wire 79. The first pulley 71 is fixed coaxially with the rotation shaft of the accelerator pedal 11 and rotates in accordance with displacement of the accelerator pedal 11. The second pulley 74 is fixed coaxially fixed with a pinion gear (not illustrated) of the rack-and-pinion steering-wheel-position changing mechanism 73. Both ends of the wire 79 are respectively wrapped around the first pulley 71 and the second pulley 74. A middle part of the wire 79 is wrapped around the intermediate pulley 77.

One end of the wire 79, which is wrapped around the first pulley 71, is wound in a direction such that the wire 79 becomes wound around the first pulley 71 by being pulled toward the accelerator pedal 11 side when the accelerator pedal 11 is depressed. The other end of the wire 79, which is wrapped around the second pulley 74, is wound in a direction such that the wire 79 becomes wound around the second pulley 74 by being pulled toward the steering wheel 7 when the steering wheel 7 moves toward the vehicle forward side. Accordingly, when the driver D depresses the accelerator pedal 11 and the operation amount θa of the accelerator pedal 11 increases, the wire 79 is let off from the second pulley 74 while becoming wound around the first pulley 71, and the steering wheel 7 displaces toward the vehicle rearward side. When the driver D takes an action of sticking his/her arms forward and the steering wheel 7 is displaced toward the vehicle forward side, the wire 79 is let off from the first pulley 71 while becoming wound around the second pulley 74, and the accelerator pedal 11 displaces in a direction such that the operation amount θa of the accelerator pedal 11 becomes zero.

The winding diameter of the wire 79 around the first pulley 71 and the winding diameter of the wire 79 around the second pulley 74 are set in accordance with the ratio of the displacement amount of the steering wheel 7 to the amount of change in the operation amount θa of the accelerator pedal 11. Alternatively, the ratio of the displacement amount of the steering wheel 7 to the amount of change in the operation amount θa of the accelerator pedal 11 may be set by providing a speed reducer or speed increaser including a combination of a plurality of gears, instead of the first pulley 71 or in addition to the first pulley 71, or instead of the second pulley 74 or in addition to the second pulley 74.

The second transmission mechanism 85 increases the operation amount of the brake pedal 12 by transmitting an action of the steering-wheel-position changing mechanism 73 due to movement of the steering wheel 7 further toward the vehicle forward side than the reference position to the movable part of the brake pedal 12. The second transmission mechanism 85 illustrated in FIG. 9 includes a first pulley 81, a second pulley 84, an intermediate pulley 87, and a wire 89, as with the first transmission mechanism 75. However, the direction in which the wire 89 is wound around the first pulley 81 is opposite to the direction in which the wire 79 is wound around the first pulley 71 of the first transmission mechanism 75. Accordingly, when the driver D pushes the steering wheel 7 toward the vehicle forward side, the wire 89 is let off from the first pulley 81 while becoming wound around the second pulley 84, and the brake pedal 12 displaces in a direction such that the operation amount of the brake pedal 12 increases.

Also in the second transmission mechanism 85, the winding diameter of the wire 89 around the first pulley 81 and the winding diameter of the wire 89 around the second pulley 84 are set in accordance with the ratio of the operation amount of the brake pedal 12 to the displacement amount of the steering wheel 7. Alternatively, the ratio of the operation amount of the brake pedal 12 to the displacement amount of the steering wheel 7 may be set by providing a speed reducer or speed increaser including a combination of a plurality of gears, instead of the first pulley 81 or in addition to the first pulley 81, or instead of the second pulley 84 or in addition to the second pulley 84.

Also with the pedal-application-error accident preventing device 70 having the mechanical mechanism, it is possible to change the position St_str of the steering wheel 7 toward the vehicle rearward side when the accelerator pedal 11 is depressed, and to create a state in which the steering wheel 7 can be moved forward when the driver D takes an action of sticking his/her arms forward. Moreover, when, for example, the driver D panics in an emergency and takes the action of sticking his/her arms forward, the pedal-application-error accident preventing device 70 displaces the accelerator pedal 11 in a direction such that the operation amount θa of the accelerator pedal 11 returns to zero as the steering wheel 7 is pushed forward. Accordingly, in an emergency, a reaction force against the action of the driver D of depressing the accelerator pedal 11 is generated, and it is possible to prevent the driver D from further depressing the accelerator pedal 11. Moreover, it is possible to cause the driver D to feel a reaction force against depression of the accelerator pedal 11 by the driver D, and to allow the driver D to recognize that he/she is performing a misoperation. Thus, it is also possible to expect that the driver D recovers from the panic. Furthermore, it is possible to decelerate the vehicle because, as the steering wheel 7 is pushed forward, the accelerator pedal 11 displaces in a direction such that the operation amount θa of the accelerator pedal 11 returns to zero. In this way, the pedal-application-error accident preventing device 70 according to the present embodiment can suppress an accident or lessen the impact of an accident due to misapplication of the accelerator pedal 11 by utilizing an action that the driver D takes in a panic.

Moreover, when the steering wheel 7 is pushed further forward than the reference position St_str_0, the pedal-application-error accident preventing device 70 according to the present embodiment displaces the brake pedal 12 in a direction such that the operation amount of the brake pedal 12 increases. Accordingly, it is possible to actively decelerate the vehicle and to increase the effect of suppressing the accident due to misapplication of the accelerator pedal 11 or lessening the impact due to the accident.

The structure of the pedal-application-error accident preventing device 70 illustrated in FIG. 8 is an example and may be modified in any appropriate way. For example, a member that transmits rotation between the first pulley and the second pulley is not limited to a wire and may be another member such as a belt or a chain. The first pulley, the second pulley, and the intermediate pulley may be gears. The number of intermediate pulley is not limited to one and may be any appropriate number. Moreover, a part of a part of the wire may be disposed in a tube that is fixed at an appropriate position, and, without using an intermediate pulley, the rotational action of the accelerator pedal 11 or the brake pedal 12 and the action of the steering-wheel-position changing mechanism 31 due to displacement of the steering wheel 7 in the vehicle forward-rearward direction may be enabled to be transmitted to each other.

Heretofore, embodiments of the disclosure have been described in detail with reference to the drawings. However, the disclosure is not limited to these examples. It is clear that a person having ordinary skill in the art could have conceived of various modifications and corrections within the technical idea described in the claims, and it is to be understood that these are naturally included in the technical scope of the disclosure.

For example, the following configurations are also included in the technical scope of the disclosure.

A pedal-application-error accident preventing device is the pedal-application-error accident preventing device 10 according to the first embodiment 10 further including a braking-operation instructor that generates an instruction signal for generating a braking force of the vehicle.

The braking-operation instructor generates an instruction signal for generating a braking force in a vehicle as the steering wheel is further pushed forward after the operation amount of the accelerator pedal has been returned to zero by the accelerator-pedal-position adjuster.

A pedal-application-error accident preventing device is the pedal-application-error accident preventing device 10 according to a first embodiment, further including an actuator and a brake-pedal-position adjuster.

The actuator displaces the brake pedal and a brake-pedal-position adjuster. The brake-pedal-position adjuster controls driving of an actuator that displaces the brake pedal.

The brake-pedal-position adjuster displaces the brake pedal in s direction such that an operation amount of the brake pedal increases when the steering wheel is pushed back forward in a state in which the steering wheel is displaced toward the vehicle rearward side.

A pedal-application-error accident preventing device is the pedal-application-error accident preventing device 70 according to the second embodiment, in which the steering-wheel-position adjuster and the accelerator-pedal-position adjuster include a transmission mechanism.

The transmission mechanism moves the steering wheel toward the vehicle rearward side by transmitting, to the steering-wheel-position changing mechanism, an action of the movable part of the accelerator pedal due to an increase in the operation amount of the accelerator pedal. The transmission mechanism transmits the action of the steering-wheel-position changing mechanism in a state in which the steering wheel is pushed back forward in as state in which the steering wheel is displaced toward the vehicle rearward side, and displaces the accelerator pedal in a direction such that the operation amount of the accelerator pedal returns to zero.

As described above, with the disclosure, it is possible to suppress occurrence of an accident due to misapplication of a brake pedal and an accelerator pedal.

The control device 50 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 50 including the steering-wheel-position adjuster 51, the accelerator-pedal-position adjuster 53, and the braking-operation instructor 55. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A pedal-application-error accident preventing device to be applied to a vehicle, the pedal-application-error accident preventing device comprising:
    a steering-wheel-position changing mechanism configured to displace a steering wheel of the vehicle in a vehicle forward-rearward direction;
    a steering-wheel-position adjuster configured to displace the steering wheel in accordance with an operation amount of an accelerator pedal of the vehicle such that the steering wheel is positioned further toward a vehicle rearward side as the operation amount of the accelerator pedal operated by a driver who drives the vehicle increases; and
    an accelerator-pedal-position adjuster configured to displace the accelerator pedal in a direction such that the operation amount of the accelerator pedal returns to zero in a case where the steering wheel is pushed back forward in a state in which the steering wheel is displaced toward the vehicle rearward side.

2. The pedal-application-error accident preventing device according to claim 1, further comprising:
    an accelerator-pedal-position detector configured to detect the operation amount of the accelerator pedal,
    wherein the steering-wheel-position changing mechanism comprises a steering wheel actuator configured to displace the steering wheel, and
    wherein the steering-wheel-position adjuster is configured to control driving of the steering wheel actuator based on the operation amount of the accelerator pedal detected by the accelerator-pedal-position detector.

3. The pedal-application-error accident preventing device according to claim 1, further comprising:
a depressing-force sensor configured to detect a force with which the driver depresses the accelerator pedal,
wherein the steering-wheel-position adjuster is configured to control driving of the steering wheel actuator based on the force with which the driver depresses the accelerator pedal detected by the depressing-force sensor.

4. The pedal-application-error accident preventing device according to claim 2, further comprising:
a depressing-force sensor configured to detect a force with which the driver depresses the accelerator pedal,
wherein the steering-wheel-position adjuster is configured to control the driving of the steering wheel actuator based on the force with which the driver depresses the accelerator pedal detected by the depressing-force sensor.

5. The pedal-application-error accident preventing device according to claim 1, further comprising:
an acceleration sensor configured to detect an acceleration of displacement of the accelerator pedal,
wherein the steering-wheel-position adjuster is configured to control driving of the actuator based on the acceleration of the displacement of the accelerator pedal detected by the acceleration sensor.

6. The pedal-application-error accident preventing device according to claim 2, further comprising:
an acceleration sensor configured to detect an acceleration of displacement of the accelerator pedal,
wherein the steering-wheel-position adjuster is configured to control the driving of the actuator based on the acceleration of the displacement of the accelerator pedal detected by the acceleration sensor.

7. The pedal-application-error accident preventing device according to claim 2, further comprising:
a steering-wheel-position detector configured to detect a position of the steering wheel in the vehicle forward-rearward direction;
an accelerator pedal actuator configured to displace the accelerator pedal; and
an accelerator-pedal-position adjuster configured to control driving of the accelerator pedal actuator configured to displace the accelerator pedal,
wherein the accelerator-pedal-position adjuster is configured to displace the accelerator pedal in the direction such that the operation amount of the accelerator pedal returns to zero in a case where the steering wheel is pushed back forward in the state in which the steering wheel is displaced toward the vehicle rearward side.

8. The pedal-application-error accident preventing device according to claim 3, further comprising:
a steering-wheel-position detector configured to detect a position of the steering wheel in the vehicle forward-rearward direction;
an accelerator pedal actuator configured to displace the accelerator pedal; and
an accelerator-pedal-position adjuster configured to control driving of the accelerator pedal actuator configured to displace the accelerator pedal,
wherein the accelerator-pedal-position adjuster is configured to displace the accelerator pedal in the direction such that the operation amount of the accelerator pedal returns to zero in a case where the steering wheel is pushed back forward in the state in which the steering wheel is displaced toward the vehicle rearward side.

9. The pedal-application-error accident preventing device according to claim 4, further comprising:
a steering-wheel-position detector configured to detect a position of the steering wheel in the vehicle forward-rearward direction;
an accelerator pedal actuator configured to displace the accelerator pedal; and
an accelerator-pedal-position adjuster configured to control driving of the accelerator pedal actuator configured to displace the accelerator pedal,
wherein the accelerator-pedal-position adjuster is configured to displace the accelerator pedal in the direction such that the operation amount of the accelerator pedal returns to zero in a case where the steering wheel is pushed back forward in the state in which the steering wheel is displaced toward the vehicle rearward side.

10. The pedal-application-error accident preventing device according to claim 5, further comprising:
a steering-wheel-position detector configured to detect a position of the steering wheel in the vehicle forward-rearward direction;
an accelerator pedal actuator configured to displace the accelerator pedal; and
an accelerator-pedal-position adjuster configured to control driving of the accelerator pedal actuator configured to displace the accelerator pedal,
wherein the accelerator-pedal-position adjuster is configured to displace the accelerator pedal in the direction such that the operation amount of the accelerator pedal returns to zero in a case where the steering wheel is pushed back forward in the state in which the steering wheel is displaced toward the vehicle rearward side.

11. The pedal-application-error accident preventing device according to claim 6, further comprising:
a steering-wheel-position detector configured to detect a position of the steering wheel in the vehicle forward-rearward direction;
an accelerator pedal actuator configured to displace the accelerator pedal; and
an accelerator-pedal-position adjuster configured to control driving of the accelerator pedal actuator configured to displace the accelerator pedal,
wherein the accelerator-pedal-position adjuster is configured to displace the accelerator pedal in the direction such that the operation amount of the accelerator pedal returns to zero in a case where the steering wheel is pushed back forward in the state in which the steering wheel is displaced toward the vehicle rearward side.

12. A pedal-application-error accident preventing device to be applied to a vehicle, the pedal-application-error accident preventing device comprising:
a steering-wheel-position changing mechanism configured to displace a steering wheel of the vehicle in a vehicle forward-rearward direction; and
circuitry configured to
displace the steering wheel in accordance with an operation amount of an accelerator pedal of the vehicle such that the steering wheel is positioned further toward a vehicle rearward side as the operation amount of the accelerator pedal operated by a driver who drives the vehicle increases, and displace the accelerator pedal in a direction such that the operation amount of the accelerator pedal returns to zero in a case where the steering wheel is pushed back forward in a state in which the steering wheel is displaced toward the vehicle rearward side.

* * * * *